(12) United States Patent
Vance

(10) Patent No.: US 9,568,149 B2
(45) Date of Patent: Feb. 14, 2017

(54) HIGHLY-COMPACTABLE CAMERA CRANE

(71) Applicant: Dan Vance, San Diego, CA (US)

(72) Inventor: Dan Vance, San Diego, CA (US)

( * ) Notice: Subject to any disclaimer, the term of this patent is extended or adjusted under 35 U.S.C. 154(b) by 0 days.

(21) Appl. No.: 15/192,995

(22) Filed: Jun. 24, 2016

(65) Prior Publication Data

US 2016/0377224 A1  Dec. 29, 2016

Related U.S. Application Data

(60) Provisional application No. 62/231,086, filed on Jun. 25, 2015.

(51) Int. Cl.
*F16M 13/02* (2006.01)
*G03B 17/56* (2006.01)

(52) U.S. Cl.
CPC .......... *F16M 13/022* (2013.01); *G03B 17/561* (2013.01)

(58) Field of Classification Search
None
See application file for complete search history.

(56) References Cited

U.S. PATENT DOCUMENTS

| | | | | |
|---|---|---|---|---|
| 3,750,846 A * | 8/1973 | Huxley, III | ............ | A01D 46/20 182/141 |
| 4,005,840 A * | 2/1977 | Ratkovich | .............. | A47C 16/00 211/202 |
| 4,943,019 A * | 7/1990 | Mester | .................. | B66F 11/048 248/123.11 |
| 6,478,427 B1 * | 11/2002 | Morris | .................. | B66F 11/048 248/123.11 |
| 7,204,650 B2 * | 4/2007 | Ghanouni | .............. | G03B 17/00 396/420 |
| 2015/0077614 A1 * | 3/2015 | King | ..................... | G03B 17/561 348/311 |
| 2015/0334271 A1 * | 11/2015 | Hartig | .................. | G03B 17/561 348/148 |

\* cited by examiner

*Primary Examiner* — W B Perkey
(74) *Attorney, Agent, or Firm* — Michael R. Shevlin

(57) ABSTRACT

A highly-compactable camera crane enables a load platform to be kept level as the boom is raised and lowered. A main boom is comprised of a number of crossed links which pivot at their crossings to allow extension and retraction of the boom and an auxiliary boom of similar crossed link construction couples the load platform to a reference pivot point of the main boom, enabling the load platform to be kept level as the booms are moved up and down relative to the pivot point.

20 Claims, 8 Drawing Sheets

HIGHLY-COMPACTABLE CAMERA CRANE

CROSS-REFERENCE TO RELATED APPLICATIONS

This application claims the benefit of U.S. Provisional Application No. 62/231,086, filed Jun. 25, 2015, which is incorporated herein by reference.

BACKGROUND

Many lifting and positioning devices use a boom structure to lift and position a load. In some applications, the load platform needs to be kept level as the boom is raised and lowered. Some examples are a boom where the load is a person, or booms used to smoothly move and position an operating motion picture camera.

With a boom of fixed length, a common technique of maintaining a level load platform is through the use of an auxiliary fixed-length boom or arm, above or below the load-carrying boom, and parallel to the boom. This arrangement forms a parallelogram. If the attachment points for the boom and the second arm are collinear and perpendicular to the ground, and the boom and arm are equal lengths, then the attachment points at the other ends of the boom and arm will also remain collinear and perpendicular to the ground as the boom is raised and lowered. Any platform then attached at the end of the boom, perpendicular to the line formed by the attachment points of the boom and the arm, will thus be parallel to, and therefore level with, the ground at any height of the boom.

A shortcoming of these devices in the current art is their mechanical complexity, requiring time-consuming assembly and disassembly each time they are used. Another shortcoming is that, due to the nature of the boom designs in the current art, they often have a relatively long minimum fixed length dimension even when disassembled, making them difficult to transport. Still another shortcoming is that most if not all assembly methods entail the use of peripheral fasteners, clips, pins and other hardware that are easily lost over the courses of assembly, disassembly and transit.

In view of this, it would be desirable to develop a method or methods of constructing or fabricating a highly compactable camera crane.

SUMMARY

The present invention is a unique and innovative solution to the limitations and shortcomings of the devices in the current art.

In one aspect, the invention is a highly compactable camera crane comprising two components: a fulcrum supporting a first boom constructed of a series of crossed links to enable simple and rapid extension for use and retraction for transport, and a similarly constructed second boom, pivotably connected to a load platform. The first boom may be pivotably connected near the center of its length to the fulcrum and at its distal end to the load platform. The second boom may be pivotably and removably connected between the fulcrum and the load platform such that the orientation of the load platform is maintained as the first and second booms are pivoted up and down about the fulcrum.

DETAILED DESCRIPTION

Embodiments of the invention will now be described with reference to the figures, wherein like numerals reflect like elements throughout. The terminology used in the description presented herein is not intended to be interpreted in any limited or restrictive way, simply because it is being utilized in conjunction with detailed descriptions of certain specific embodiments of the invention. Furthermore, embodiments of the invention may include several novel features, no single one of which is solely responsible for its desirable attributes or which is essential to practicing the invention described herein.

FIGS. 1 through 8 show one embodiment of a highly compactable camera crane.

Figure 1:
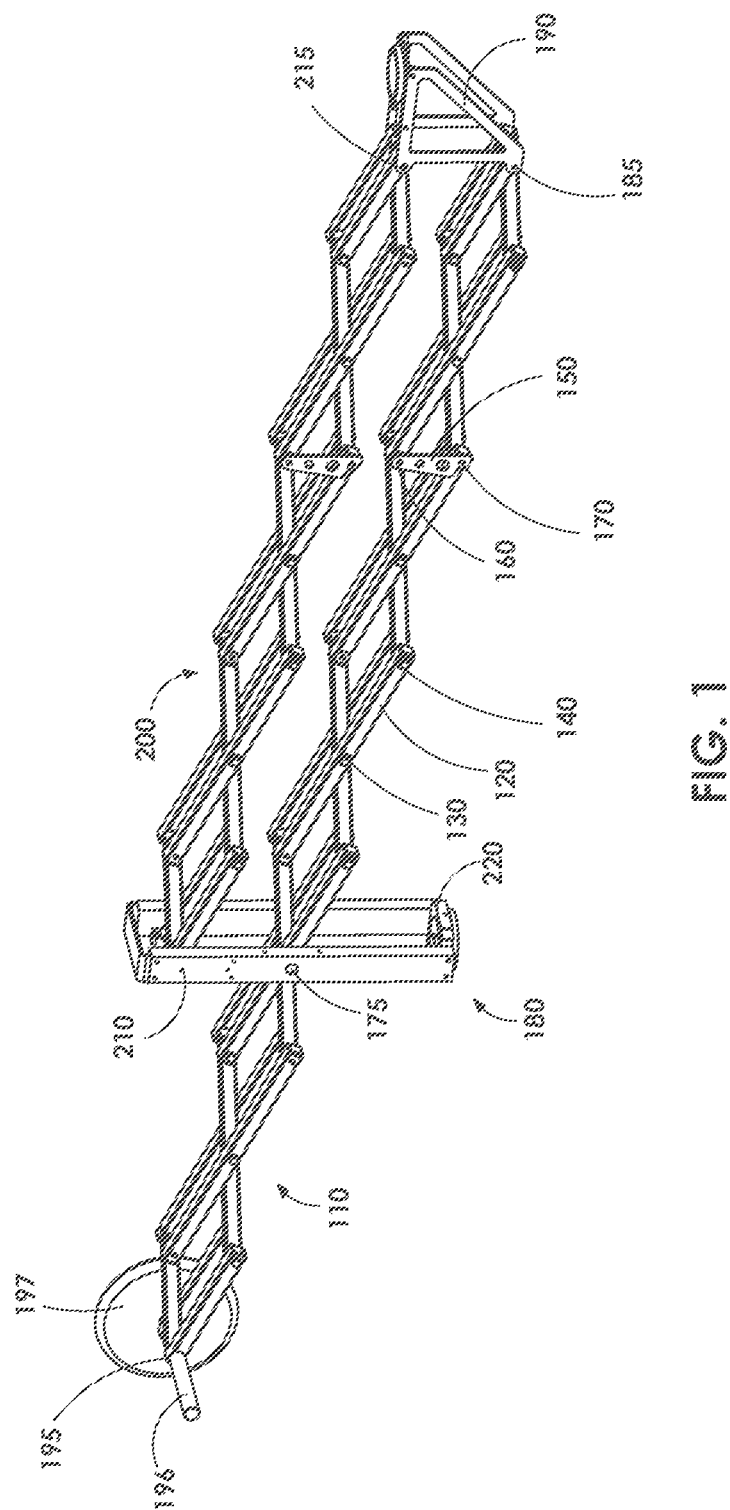
FIG. 1 is a perspective view of a highly compactable camera crane shown in an extended configuration.

FIG. 1 is a perspective view of a highly compactable camera crane shown in an extended configuration. A main boom 110 may be comprised of a number of connected crossed links 120 in a scissor like configuration which pivot at their central 130 and distal 140 connections to allow extension and retraction of the boom. The main boom may be reversibly locked into an extended configuration by a locking arm 150 which may pivot about a distal axle 160 of a link 120 and removably capture the vertically adjacent distal axle 170. The main boom may be pivotably connected to an axle 175 of a fulcrum structure 180. In some embodiments, one end of the main boom 110 may be hingedly and removably connected to an axle 185 of the load platform 190. In other embodiments, one end of the main boom 110 may be hingedly and removably connected the load platform 190 using a pull pin 185 secured to the main boom by means of a lanyard. The other end of the main boom may have a feature 195 allowing removable attachment of supports 196 that accommodate counterweighting disks 197.

An auxiliary boom 200, constructed of crossed pivoting links similar to the main boom thus allowing similar extension and retraction. In some embodiments, the auxiliary boom 200 is hingedly and removably attach to an axle 210 on the fulcrum structure vertically offset from the main boom axle 175 of the fulcrum structure. In other embodiments, the auxiliary boom 200 is hingedly and removably attach to the fulcrum structure using a pull pin 210 secured to the auxiliary boom by means of a lanyard. The other end of the auxiliary boom may hingedly and removably attach to an axle 215 of the load platform 190.

The fulcrum structure may include a base 220 allowing rotation of the entire crane assembly about the vertical axis of the fulcrum structure. The fulcrum structure may further include lifting handle disposed at the upper end of the fulcrum structure.

Figure 2:
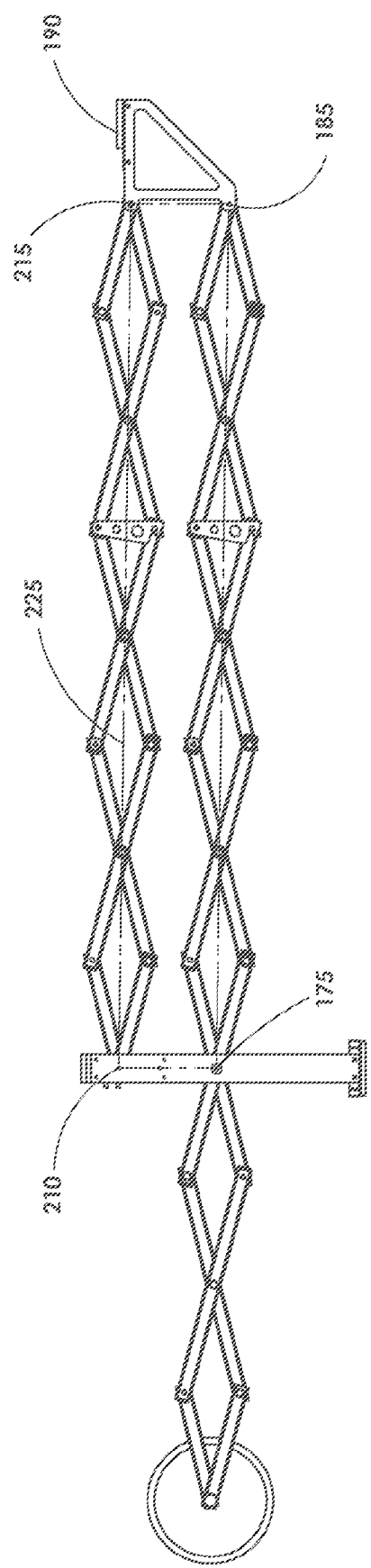
FIG. 2 is a left side elevational view of the highly compactable camera crane with the boom level.

FIG. 2 shows a left-side elevational view of the highly compactable camera crane of FIG. 1 with the main and auxiliary booms parallel to the ground and with the top surface of the load platform 190 kept parallel to the ground by the parallelogram configuration 225 created by the main boom and its attachment at the lower fulcrum axle 175 and the lower load platform axle 185, and the auxiliary boom and its attachment at the upper fulcrum axle 210 and the upper load platform axle 215.

Figure 3:
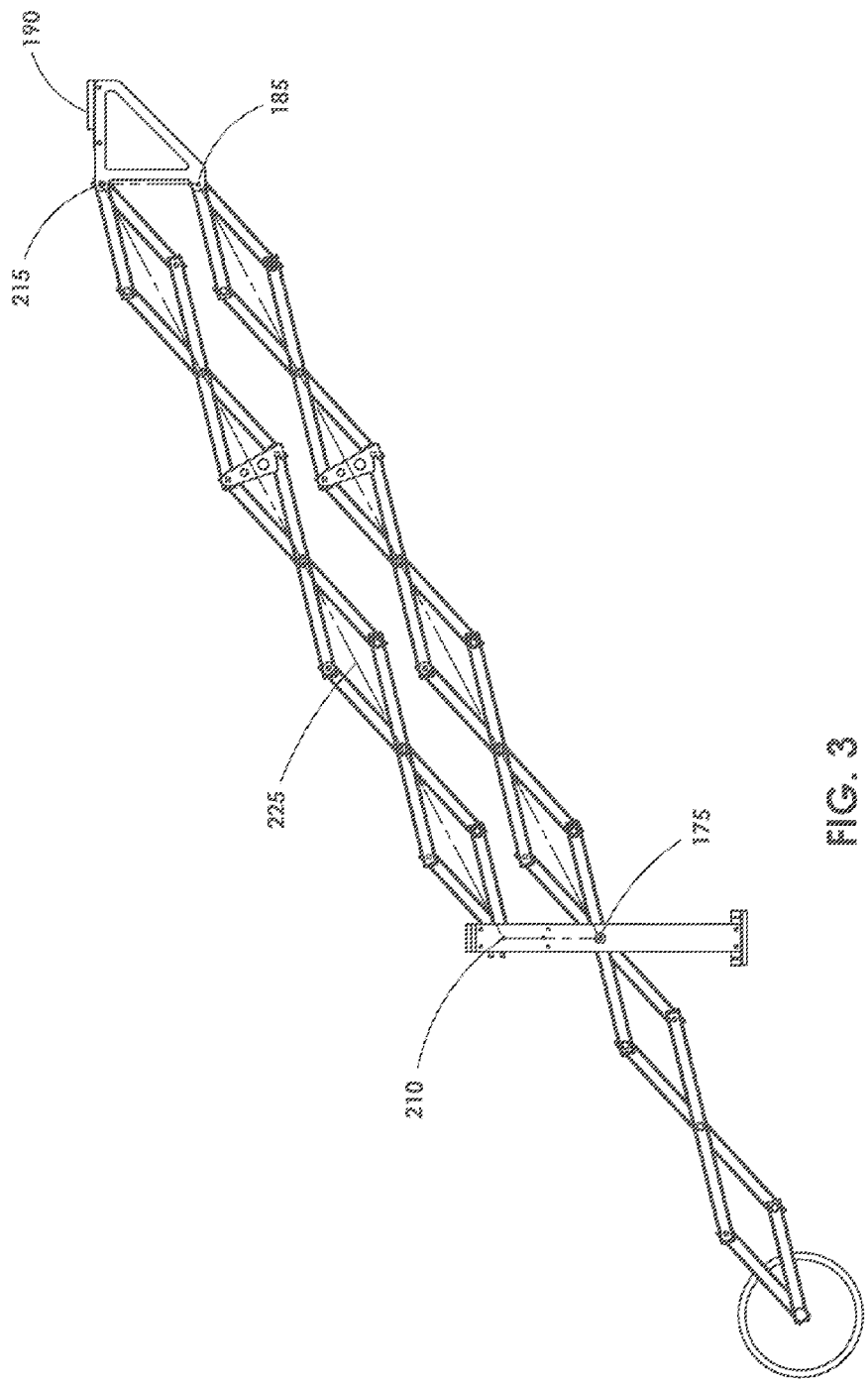
FIG. 3 is a left side elevational view of the highly compactable camera crane with the boom raised.

FIG. 3 shows the camera crane of FIG. 1 with the load platform 190 raised and with the top surface of the load platform kept parallel to the ground by the parallelogram configuration 225 created by the attachment points to the fulcrum and the load platform.

Figure 4:
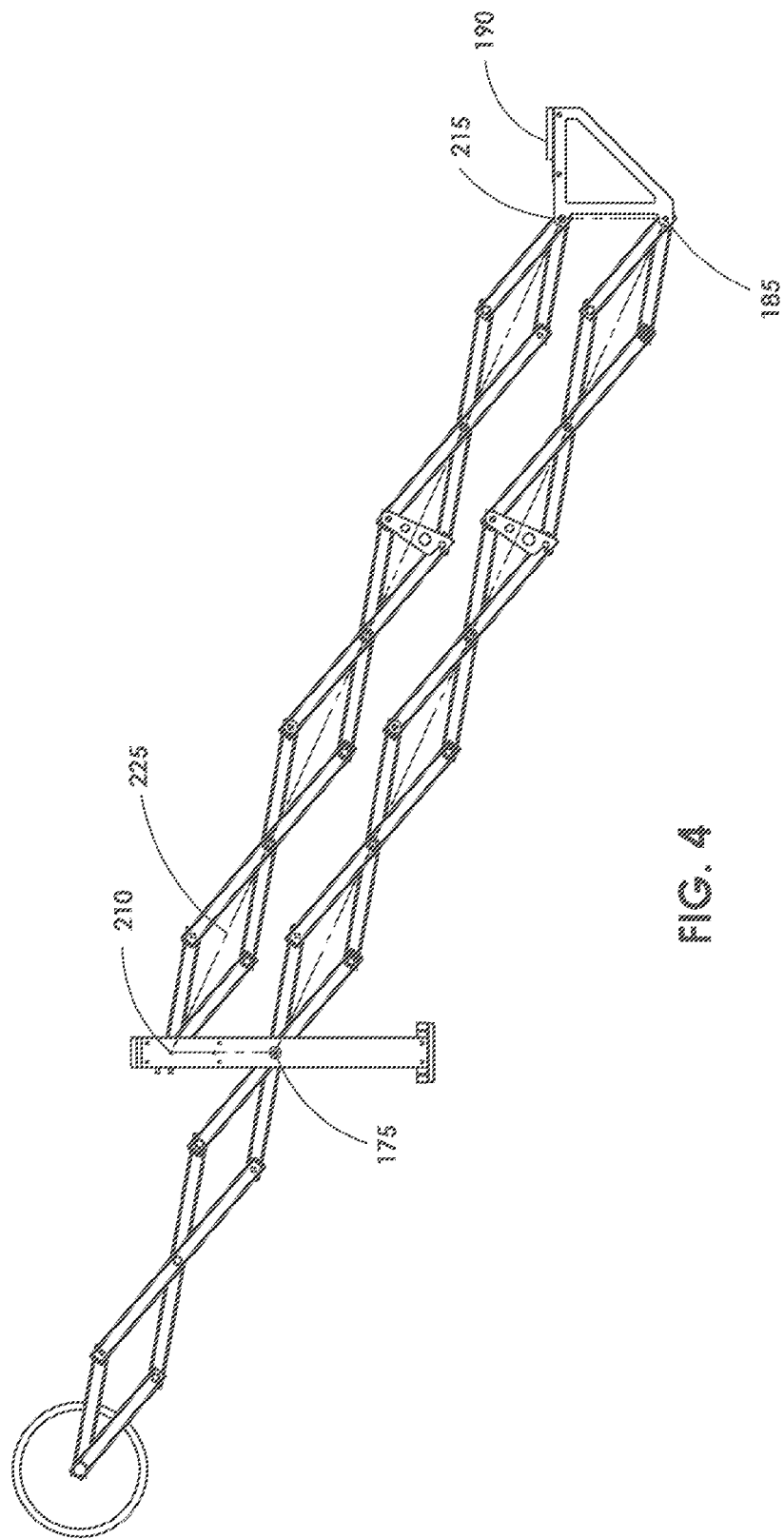
FIG. 4 is a left side elevational view of the highly compactable camera crane with the boom lowered.

FIG. 4 shows the camera crane of FIG. 1 with the load platform 190 lowered and with the top surface of the load platform kept parallel to the ground by the parallelogram configuration 225 created by the attachment points to the fulcrum and the load platform.

Figure 5:
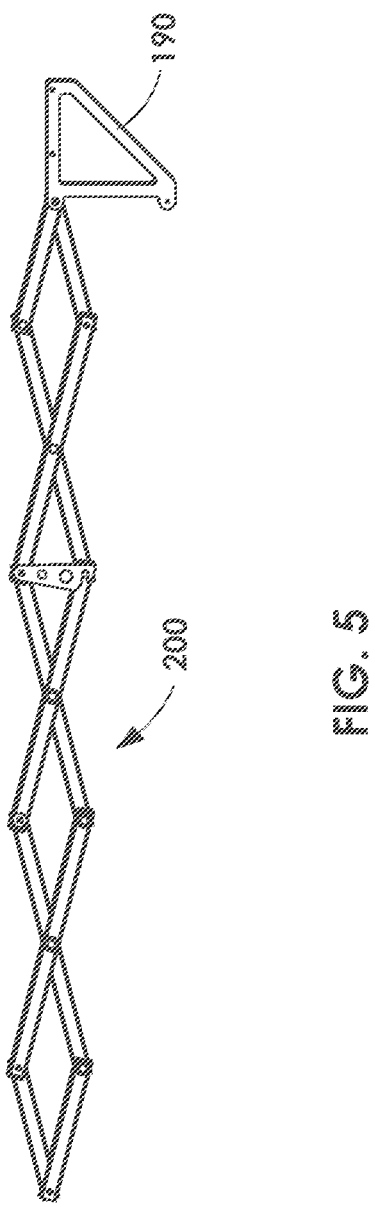
FIG. 5 is a left side elevational view of the highly compactable camera crane in a partially retracted configuration.

FIG. 5 shows a left elevational view of the auxiliary boom 200 and load platform 190 assembly with the auxiliary boom in an extended configuration. The load platform is pivotably connected to a distal end of the auxiliary boom.

Figure 6:
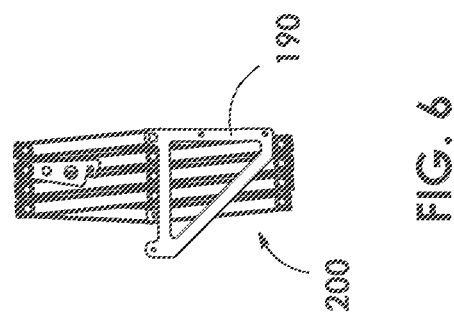
FIG. 6 is a left side elevational view of the highly compactable camera crane in a fully retracted configuration.

FIG. 6 shows the auxiliary boom 200 and load platform 190 of FIG. 5 with the auxiliary boom in a compacted configuration and the load platform rotated to a maximally compacted position.

Figure 7:
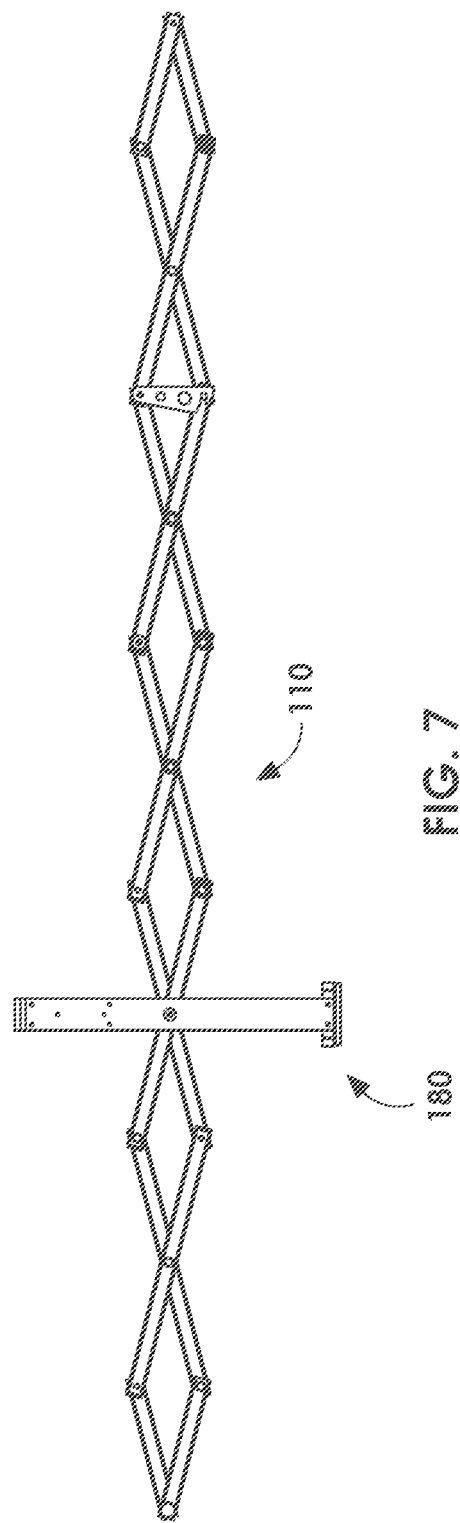
FIG. 7 is a top plan view of the highly compactable camera crane shown in an extended configuration.

FIG. 7 shows a left elevational view of the main boom 110 and fulcrum structure 180 assembly with the main boom in an extended configuration. The fulcrum is pivotably connected to the main boom at an intermediate position.

Figure 8:
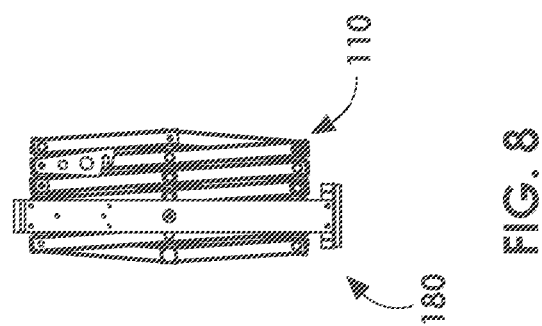
FIG. 8 is a front elevational view of the highly compactable camera crane shown in an extended configuration.

FIG. 8 shows the main boom 110 and fulcrum structure 180 of FIG. 6 with the main boom in a compacted configuration.

Thus for transport the main boom and fulcrum assembly and the auxiliary boom and load platform assembly may be retracted to a fraction of their extended lengths, as shown in FIG. 6 and FIG. 8.

In one embodiment, the load platform may be pivotable for transport, with the pivotability feature being achieved without the need for any unconstrained hardware or tools.

In one embodiment, counterweight disk support members may removably attach to the distal end of the main boom without the need for any unconstrained hardware or tools.

In one embodiment, counterweight disk support members may removably attach to features at the distal end of the main boom for transport, such that the support members are oriented parallel and coaxial with the distal links when the boom is in a compacted configuration without the need for any unconstrained hardware or tools.

In one embodiment, attachment of the load platform to the main boom may be facilitated by a pull pin secured to the main boom by means of a lanyard.

Thus the aforementioned shortcomings of devices in the current art are overcome in the current invention, which provides significant novel improvements in design, versatility, transportability, ease of assembly and disassembly, and usability.

It is intended that the specification and examples be considered as exemplary only, with a true scope and spirit of the invention being indicated by the following claims. In addition, where this application has listed the steps of a method or procedure in a specific order, it may be possible, or even expedient in certain circumstances, to change the order in which some steps are performed, and it is intended that the particular steps of the method or procedure claims set forth here below not be construed as being order-specific unless such order specificity is expressly stated in the claim.

The invention claimed is:

1. A compactable camera crane comprising:
   a main boom having a number of crossed links pivotably connected at central and distal points along its length enabling extended and compacted configurations of said main boom;
   an auxiliary boom having a number of crossed links pivotably connected at central and distal points along its length enabling extended and compacted configurations, said main boom having a length longer than said auxiliary boom;
   a fulcrum pivotably supporting said main boom at an intermediate position, and pivotably and detachably connected to a distal end of said auxiliary boom;
   a load platform pivotably connected to a distal end of said auxiliary boom and pivotably and removably connected to a distal end of said main boom;
   wherein said auxiliary boom is position parallel to said main boom creating a parallelogram configuration with said main boom, fulcrum and load platform such that a top surface of said load platform remains parallel to the ground during movement of said main boom.

2. The compactable camera crane of claim 1, wherein the booms are reversibly fixed into an extended configuration by means of a pivotable rigid arm removably joining distal pivot points of two opposing crossed links.

3. The compactable camera crane of claim 1, wherein counterweight support arms are removably attached to a distal end of the main boom.

4. The compactable camera crane of claim 3, wherein the counterweight support arms are stored for transport in a coaxial orientation on the distal ends of the distal links of the main boom.

5. The compactable camera crane of claim 1, wherein the fulcrum includes a base allowing rotation of the camera crane about the vertical axis of the fulcrum.

6. The compactable camera crane of claim 5, wherein the rotational friction of the fulcrum base can be adjusted.

7. The compactable camera crane of claim 5, wherein a bubble-type leveling device is affixed to a horizontally planar surface of the fulcrum structure.

8. The compactable camera crane of claim 5, wherein the fulcrum structure includes a horizontally planar lower surface designed to be removably connected to a photographic tripod.

9. The compactable camera crane of claim 1, wherein captive pull pins facilitate a removable connection between the distal end of the auxiliary boom and the fulcrum.

10. The compactable camera crane of claim 1, wherein the links are substantially hollow structures.

11. The compactable camera crane of claim 1, wherein the links are substantially square in cross-section.

12. The compactable camera crane of claim 1, wherein the links are substantially rectangular in cross-section.

13. The compactable camera crane of claim 1, wherein the links are substantially circular in cross-section.

14. A compactable camera crane comprising:
   a main boom having a number of crossed links pivotably connected at central and distal points along its length enabling extended and compacted configurations of said main boom;
   an auxiliary boom having a number of crossed links pivotably connected at central and distal points along its length enabling extended and compacted configurations, said main boom having a length longer than said auxiliary boom;

a fulcrum pivotably supporting said main boom at an intermediate position, and pivotably and detachably connected to a distal end of said auxiliary boom;

a load platform pivotably connected to a distal end of said auxiliary boom and pivotably and removably connected to a distal end of said main boom;

wherein said auxiliary boom is positioned parallel to said main boom creating a parallelogram configuration with said main boom, fulcrum and load platform such that a top surface of said load platform remains parallel to the ground during movement of said main boom; and a lifting handle disposed at the upper end of the fulcrum structure.

15. The compactable camera crane of claim 14, wherein the booms are reversibly fixed into an extended configuration by means of a pivotable rigid arm removably joining distal pivot points of two opposing crossed links.

16. The compactable camera crane of claim 14, wherein counterweight support arms are removably attached to a distal end of the main boom.

17. The compactable camera crane of claim 14, wherein captive pull pins facilitate a removable connection between the distal end of said auxiliary boom and said fulcrum and the distal end of said main boom and said load platform.

18. A compactable camera crane comprising:

a first assembly comprising:

a main boom having a number of crossed links pivotably connected at central and distal points along its length enabling extended and compacted configurations;

a fulcrum pivotably supporting said main boom at an intermediate position;

a second assembly comprising:

an auxiliary boom having a number of crossed links pivotably connected at central and distal points along its length enabling extended and compacted configurations, said main boom having a length longer than said auxiliary boom;

a load platform pivotably connected to a distal end of said auxiliary boom;

wherein a distal end of said extended auxiliary boom is pivotably and detachably connectable to said fulcrum and a distal end of said extended main boom is pivotably and removably connectable to said load platform in a parallelogram configuration such that a top surface of said load platform remains parallel to the ground during movement of said main boom.

19. The compactable camera crane of claim 18, wherein said booms are reversibly fixed into an extended configuration by means of a pivotable rigid arm removably joining distal pivot points of two opposing crossed links.

20. The compactable camera crane of claim 18, wherein captive pull pins facilitate a removable connection between said distal end of said auxiliary boom and said fulcrum, and said distal end of said main boom and said load platform.

\* \* \* \* \*